US012657040B2

(12) United States Patent (10) Patent No.: US 12,657,040 B2
Liu (45) Date of Patent: Jun. 16, 2026

(54) PAGE DISPLAY METHOD AND APPARATUS, STORAGE MEDIUM AND ELECTRONIC DEVICE

(71) Applicant: BOE Technology Group Co., Ltd., Beijing (CN)

(72) Inventor: Jiangbo Liu, Beijing (CN)

(73) Assignee: BOE TECHNOLOGY GROUP CO. , LTD., Beijing (CN)

( * ) Notice: Subject to any disclaimer, the term of this patent is extended or adjusted under 35 U.S.C. 154(b) by 0 days.

(21) Appl. No.: 18/844,093

(22) PCT Filed: Feb. 22, 2023

(86) PCT No.: PCT/CN2023/077733
§ 371 (c)(1),
(2) Date: Sep. 5, 2024

(87) PCT Pub. No.: WO2023/169215
PCT Pub. Date: Sep. 14, 2023

(65) Prior Publication Data
US 2025/0173163 A1 May 29, 2025

(30) Foreign Application Priority Data
Mar. 10, 2022 (CN) .......................... 202210231183.2

(51) Int. Cl.
*G06F 7/00* (2006.01)
*G06F 9/448* (2018.01)
*G06F 16/954* (2019.01)
*G06F 16/957* (2019.01)

(52) U.S. Cl.
CPC .......... *G06F 9/4486* (2018.02); *G06F 16/954* (2019.01); *G06F 16/9577* (2019.01)

(58) Field of Classification Search
CPC ... G06F 9/4486; G06F 16/9577; G06F 16/954
USPC .......................................... 707/600–899, 705
See application file for complete search history.

(56) References Cited

U.S. PATENT DOCUMENTS

2018/0285131 A1* 10/2018 Huang ...................... G06F 8/60

FOREIGN PATENT DOCUMENTS

| CN | 106919636 A | 7/2017 |
| CN | 107704499 A | 2/2018 |
| CN | 107818101 A | 3/2018 |
| CN | 108459888 A | 8/2018 |
| CN | 109542404 A | 3/2019 |

(Continued)

OTHER PUBLICATIONS

International Search Report and Written Opinion mailed on Apr. 13, 2023, in corresponding PCT/CN2023/077733, 15 pages.

(Continued)

*Primary Examiner* — Isaac M Woo
(74) *Attorney, Agent, or Firm* — XSENSUS LLP

(57) ABSTRACT

A method includes: when a query operation on target data in a parent page is received, sending a first request to a server so as to store a page jump parameter of the parent page, and jumping from the parent page to a sub-page corresponding to the target data; sending a second request to the server so as to acquire the page jump parameter of the parent page, and jumping from the sub-page back to the parent page according to the page jump parameter.

17 Claims, 8 Drawing Sheets

(56)  References Cited

FOREIGN PATENT DOCUMENTS

| CN | 109871209 A | 6/2019 |
| CN | 111428164 A | 7/2020 |
| CN | 112612988 A | 4/2021 |
| CN | 113467775 A | 10/2021 |
| CN | 115080154 A | 9/2022 |
| WO | 2007/107100 A1 | 9/2007 |

OTHER PUBLICATIONS

Office Action issued on Jan. 13, 2025, in corresponding Chinese patent Application No. 202210231183.2, 22 pages.

* cited by examiner

100

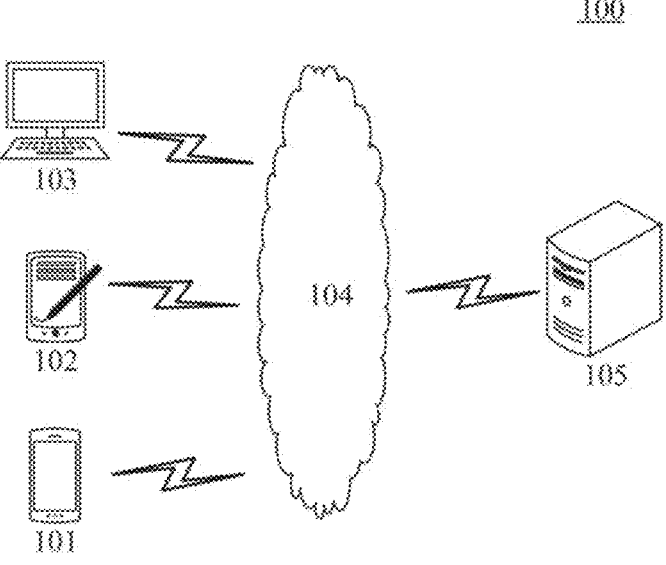

FIG. 1

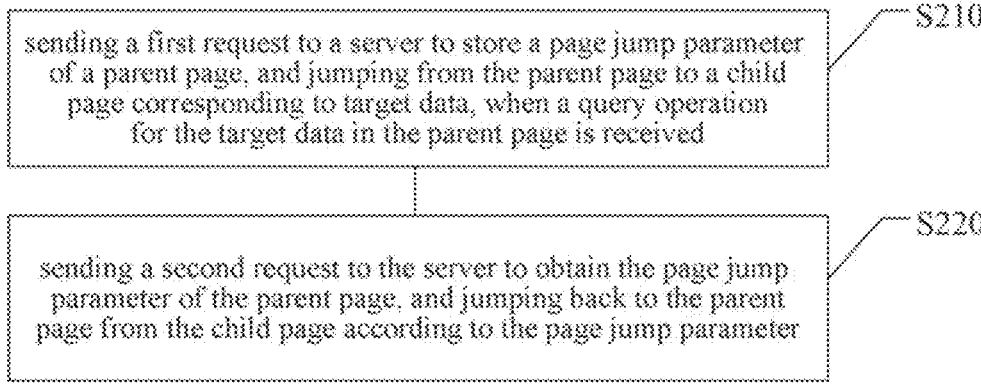

sending a first request to a server to store a page jump parameter of a parent page, and jumping from the parent page to a child page corresponding to target data, when a query operation for the target data in the parent page is received — S210 sending a second request to the server to obtain the page jump parameter of the parent page, and jumping back to the parent page from the child page according to the page jump parameter — S220

FIG. 2

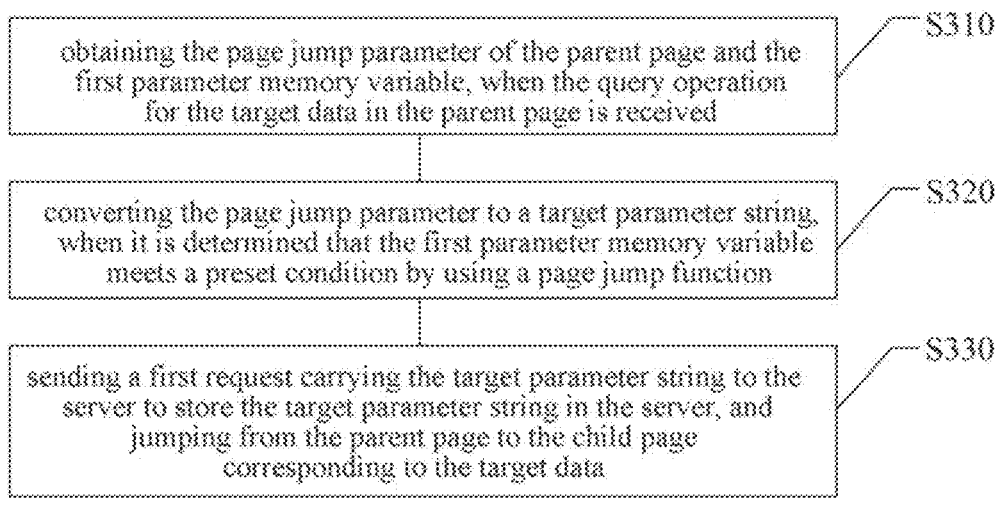

obtaining the page jump parameter of the parent page and the
first parameter memory variable, when the query operation
for the target data in the parent page is received    ⌐S310 converting the page jump parameter to a target parameter string,
when it is determined that the first parameter memory variable
meets a preset condition by using a page jump function    ⌐S320 sending a first request carrying the target parameter string to the
server to store the target parameter string in the server, and
jumping from the parent page to the child page
corresponding to the target data    ⌐S330

FIG. 3

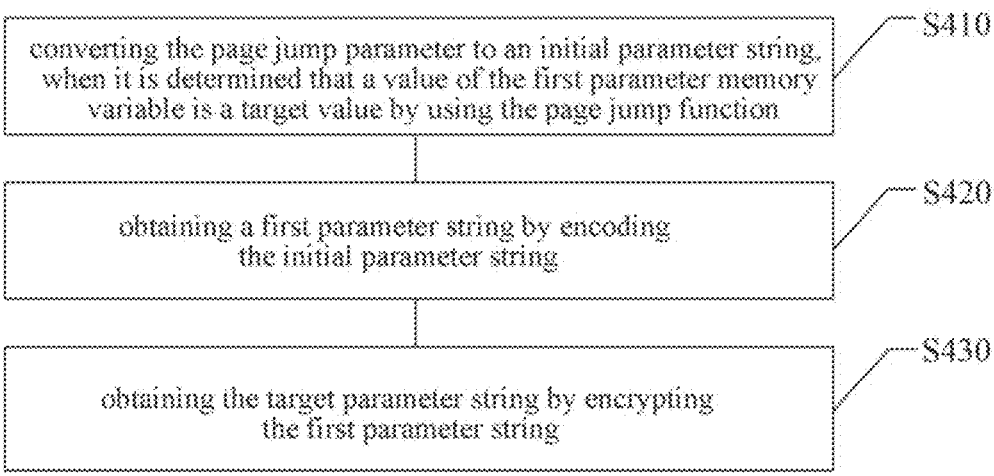

converting the page jump parameter to an initial parameter string,
when it is determined that a value of the first parameter memory
variable is a target value by using the page jump function    ⌐S410 obtaining a first parameter string by encoding
the initial parameter string    ⌐S420 obtaining the target parameter string by encrypting
the first parameter string    ⌐S430

FIG. 4

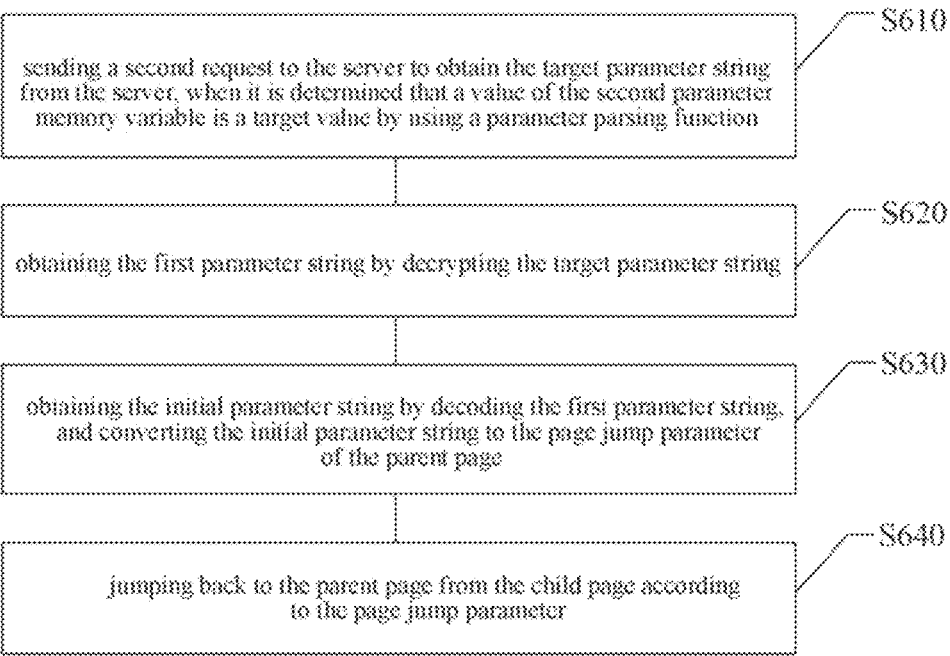

sending a second request to the server to obtain the target parameter string from the server, when it is determined that a value of the second parameter memory variable is a target value by using a parameter parsing function — S610 obtaining the first parameter string by decrypting the target parameter string — S620 obtaining the initial parameter string by decoding the first parameter string, and converting the initial parameter string to the page jump parameter of the parent page — S630 jumping back to the parent page from the child page according to the page jump parameter — S640

FIG. 6

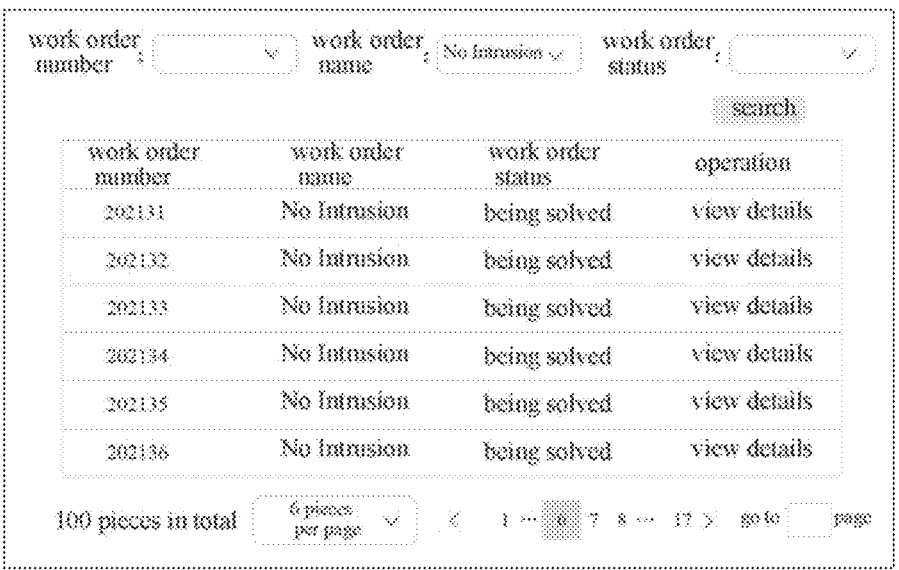

| work order number | work order name | work order status | operation |
|---|---|---|---|
| 202131 | No Intrusion | being solved | view details |
| 202132 | No Intrusion | being solved | view details |
| 202133 | No Intrusion | being solved | view details |
| 202134 | No Intrusion | being solved | view details |
| 202135 | No Intrusion | being solved | view details |
| 202136 | No Intrusion | being solved | view details |

100 pieces in total     6 pieces per page     <     1 ··· 7   8 ··· 17   >     go to ____ page

FIG. 9B work order information

| work order name | No Intrusion |
|---|---|
| work order number | 202131 |
| work order status | being solved |
| creator | San ZHANG |
| creator contact information | 11111111 |
| creation time | 2021.01.01 00: 00 |
| picture | ⊠ |

FIG. 9C

PAGE DISPLAY METHOD AND APPARATUS, STORAGE MEDIUM AND ELECTRONIC DEVICE

CROSS-REFERENCE TO RELATED APPLICATIONS

This disclosure is a U.S. National Stage of International Application No. PCT/CN2023/077733, filed on Feb. 22, 2023, which claims priority to Chinese patent application No. 202210231183.2, filed on Mar. 10, 2022, entitled "Page display method, apparatus, storage medium and electronic device", the entire contents of each are incorporated herein by reference.

TECHNICAL FIELD

This disclosure relates to the field of computer technology, and more specifically, to a page display method, a page display apparatus, a computer-readable storage medium and an electronic device.

BACKGROUND

With continuous updating of front-end technology and frameworks, the complexity of page functions and interaction has also increased. In front-end development, Vue is a progressive framework for building user interfaces. Based on the Vue framework, front-end pages can be developed quickly, for example, development of the single-page application can be achieved.

When the Vue framework is used to develop the single-page application, jumping between pages will cause page refresh. Taking the jump between the list page and the detail page as an example, after selecting certain data from the filtered list page and jumping to the detail page of the data, it will return to the initial state of the list page when returning to the list page from the detail page, without saving the last filtered query result. If the user needs to view the query result, the filtering operation needs to be performed again, which degrades the user experience.

It should be noted that the information disclosed in the above background technology section is only used to enhance the understanding of the background of the present disclosure, and therefore may include information that does not constitute the prior art known to ordinary technicians in the field.

SUMMARY

The present disclosure provides a page display method, a page display apparatus, a computer-readable storage medium, and an electronic device.

The present disclosure provides a page display method, including:

sending a first request to a server to store a page jump parameter of a parent page, and jumping from the parent page to a child page corresponding to target data, when a query operation for the target data in the parent page is received; and sending a second request to the server to obtain the page jump parameter of the parent page, and jumping back to the parent page from the child page according to the page jump parameter.

In an example embodiment of the present disclosure, before jumping from the parent page to a child page corresponding to target data, the method further includes:

configuring a target file, wherein the target file is configured to store a parent-child relationship between the parent page and the child page.

In an example embodiment of the present disclosure, before jumping from the parent page to a child page corresponding to target data, the method further includes:

defining a first parameter memory variable, wherein the first parameter memory variable is configured to mark whether to memorize the page jump parameter of the parent page;

defining a first navigation guard, wherein the first navigation guard is configured to assign values to a path attribute of the child page and a path attribute of the parent page in a first object, and assign a value to the first parameter memory variable corresponding to the parent page in the first object when it is determined that the first object exists in the target file by traversing the target file.

In an example embodiment of the present disclosure, sending a first request to a server to store a page jump parameter of a parent page, and jumping from the parent page to a child page corresponding to target data, when a query operation for the target data in the parent page is received, includes:

obtaining the page jump parameter of the parent page and the first parameter memory variable, when the query operation for the target data in the parent page is received;

converting the page jump parameter to a target parameter string, when it is determined that the first parameter memory variable meets a preset condition by using a page jump function;

sending a first request carrying the target parameter string to the server to store the target parameter string in the server, and jumping from the parent page to the child page corresponding to the target data.

In an example embodiment of the present disclosure, converting the page jump parameter to a target parameter string, when it is determined that the first parameter memory variable meets a preset condition by using a page jump function, includes:

converting the page jump parameter to an initial parameter string, when it is determined that a value of the first parameter memory variable is a target value by using the page jump function;

obtaining a first parameter string by encoding the initial parameter string;

obtaining the target parameter string by encrypting the first parameter string.

In an example embodiment of the present disclosure, before jumping back to the parent page from the child page, the method further includes:

defining a second parameter memory variable, wherein the second parameter memory variable is configured to mark whether the page jump parameter of the parent page exists in the target file;

defining a second navigation guard, wherein the second navigation guard is configured to assign values to a path attribute of the child page and a path attribute of the parent page in a second object, and assign a value to the second parameter memory variable corresponding to the parent page in the second object when it is determined that the second object exists in the target file by traversing the target file.

In an example embodiment of the present disclosure, sending a second request to the server to obtain the page jump parameter of the parent page, and jumping back to the parent page from the child page according to the page jump parameter includes:

sending a second request to the server to obtain the target parameter string from the server, when it is determined that a value of the second parameter memory variable is a target value by using a parameter parsing function;

obtaining the first parameter string by decrypting the target parameter string;

obtaining the initial parameter string by decoding the first parameter string, and converting the initial parameter string to the page jump parameter of the parent page;

jumping back to the parent page from the child page according to the page jump parameter.

In an example embodiment of the present disclosure, jumping back to the parent page from the child page according to the page jump parameter includes:

assigning a current value of the page jump parameter to an option variable, wherein the option variable is configured to save a default value of the page jump parameter;

jumping back to the parent page from the child page according to the assigned option variable.

The present disclosure provides a page display apparatus, including:

a first page display module, configured to send a first request to a server to store a page jump parameter of a parent page, and jump from the parent page to a child page corresponding to target data, when a query operation for the target data in the parent page is received; and a second page display module, configured to send a second request to the server to obtain the page jump parameter of the parent page, and jump back to the parent page from the child page according to the page jump parameter.

The present disclosure provides a non-transitory computer-readable storage medium, having computer programs stored thereon, wherein the computer programs implement any of the methods described above when executed by a processor.

The present disclosure provides an electronic device, including: a processor; and a memory, configured to store executable instructions of the processor, wherein the processor is configured to execute any of the methods described above by executing the executable instructions.

It should be understood that the above general description and the detailed description below are only exemplary and explanatory, and cannot limit the present disclosure.

BRIEF DESCRIPTION OF THE DRAWINGS

The drawings herein are incorporated into the specification and constitute a part of the specification, showing embodiments consistent with the present disclosure, and are used together with the specification to explain the principles of the present disclosure. The drawings described below are only some embodiments of the present disclosure. For ordinary technicians in this field, other drawings can also be obtained based on these drawings without creative work.

FIG. 1 shows a schematic diagram of an example system architecture of a page display method and apparatus to which the embodiment of the present disclosure can be applied;

FIG. 2 schematically shows a flow chart of a page display method according to an embodiment of the present disclosure;

FIG. 3 schematically shows a flow chart of storing page jump parameters when a page jumps according to an embodiment of the present disclosure;

FIG. 4 schematically shows a flow chart of processing page jump parameters when a page jumps according to an embodiment of the present disclosure;

FIG. 6 schematically shows a flow chart of obtaining page jump parameters when a page returns according to an embodiment of the present disclosure;

FIG. 9B schematically shows a schematic diagram of an intermediate list page according to an embodiment of the present disclosure;

FIG. 9C schematically shows a schematic diagram of a work order detail page according to an embodiment of the present disclosure;

DETAILED DESCRIPTION

Figure 5:
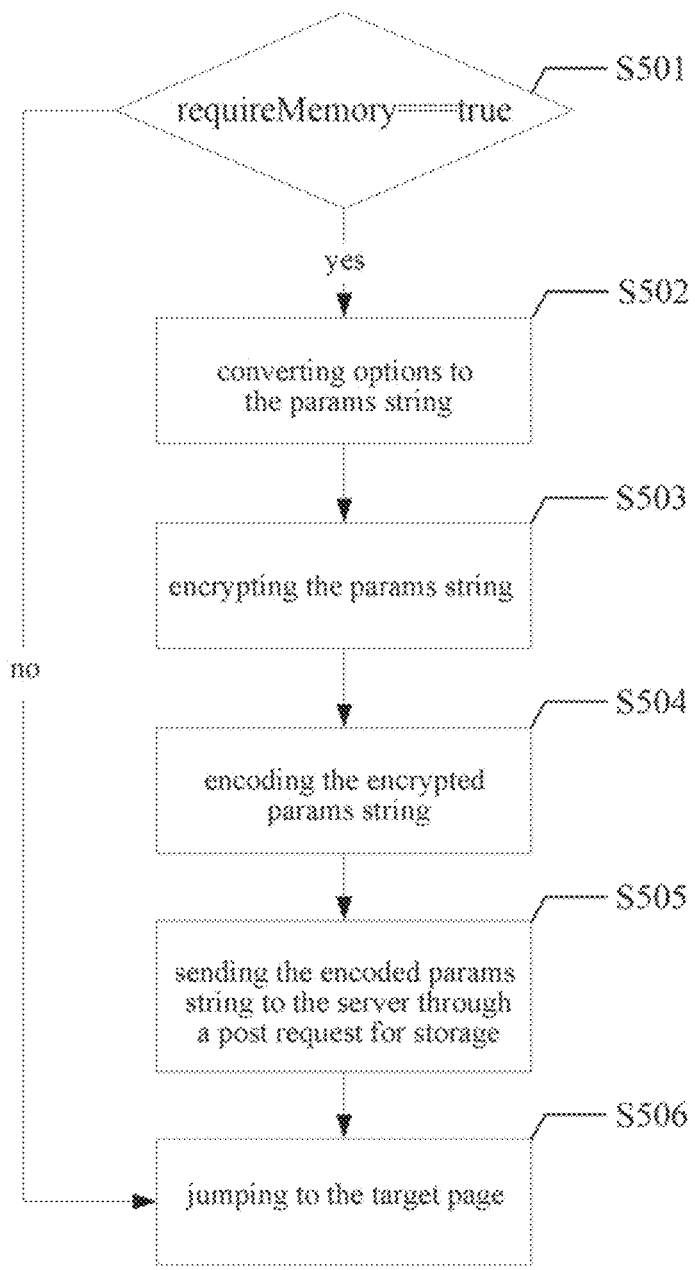
FIG. 5 schematically shows a flow chart of storing page jump parameters when a page jumps according to another embodiment of the present disclosure.

Example embodiments will now be described more fully with reference to the accompanying drawings. However, example embodiments can be implemented in a variety of forms, and should not be construed as being limited to the examples set forth herein. Rather, these embodiments are provided so that the present disclosure will be more comprehensive and complete, and the concept of the example embodiments will be fully conveyed to those skilled in the art. The described features, structures, or characteristics may be combined in one or more embodiments in any suitable manner. In the following description, many specific details are provided to provide a full understanding of the embodiments of the present disclosure. However, those skilled in the art will appreciate that the technical solutions of the present disclosure may be practiced while omitting one or more of the specific details, or other methods, components, apparatuses, steps, etc. may be adopted. In other cases, the known technical solutions are not shown or described in detail to avoid obscuring various aspects of the present disclosure.

In addition, the drawings are only schematic illustrations of the present disclosure and are not necessarily drawn to scale. The same reference numerals in the drawings represent the same or similar parts, and their repeated descriptions will be omitted. Some of the block diagrams shown in the drawings are functional entities and do not necessarily correspond to physically or logically independent entities. These functional entities may be implemented in a software form, or in one or more hardware modules or integrated circuits, or in different networks and/or processor devices and/or microcontroller devices.

FIG. 1 shows a schematic diagram of a system architecture of example application environment in which a page display method and apparatus according to an embodiment of the present disclosure can be applied.

As shown in FIG. 1, the system architecture 100 may include one or more of terminal devices 101, 102, 103, a network 104, and a server 105. The network 104 is used to provide a medium for a communication link between the terminal devices 101, 102, 103 and the server 105. The network 104 may include various connection types, such as wired, wireless communication links or optical fiber cables, etc. The terminal devices 101, 102, 103 may be various electronic devices, including but not limited to desktop computers, portable computers, smart phones, and tablet computers, etc., for providing a user interface for page display. For example, a client (such as a browser) is installed on the terminal device, and pages can be browsed through the browser client. Specifically, the browser on the terminal device can be used to perform: sending a first request to a server to store a page jump parameter of a parent page, and jumping from the parent page to a child page corresponding to target data, when a query operation for the target data in the parent page is received; and sending a second request to the server to obtain the page jump parameter of the parent page, and jumping back to the parent page from the child page according to the page jump parameter. It should be understood that, the number of terminal devices, networks, and servers in FIG. 1 is only schematic. According to implementation needs, there can be any number of terminal devices, networks, and servers. For example, the server 105 can be a server, a server cluster consisting of a plurality of servers, or a cloud computing platform or a virtualization center. In addition, the server 105 can be used to provide background services for view components that support page display.

The page display method provided in the embodiment of the present disclosure is generally executed by one or more of the terminal devices 101, 102, and 103. Correspondingly, the page display apparatus is generally arranged in the terminal devices 101, 102, and 103. For example, after being executed by the terminal device, the last query result can be directly displayed on the display screen of the terminal device. This example embodiment is not particularly limited to this. However, it is easy for those skilled in the art to understand that the page display method provided in the embodiment of the present disclosure can also be executed by the server 105. Correspondingly, the page display apparatus can also be arranged in the server 105. The server can store the query condition selected by the user, so that the last query result can be returned according to the query condition when the page jump is performed, and the terminal device can display it to the user.

The technical solution of the embodiment of the present disclosure is elaborated in detail below:

With continuous updating of front-end technology and frameworks, the complexity of page functions and interactions has also increased. In front-end development, Vue is a progressive framework for building user interfaces. Based on the Vue framework, front-end pages can be developed quickly, for example, development of the single-page application can be achieved.

When using the Vue-Cli framework (a scaffolding tool in the Vue framework) to develop the single-page application, jumping between pages will cause page refresh. Taking the jump between the list page and the detail page as an example, after selecting certain data from the filtered list page and jumping to the detail page of the data, it will return to the initial state of the list page when returning to the list page from the detail page, without saving the last filtered query result. If the user needs to view the query result, the filtering operation needs to be performed again, which degrades the user experience.

Based on one or more of the above problems, this example embodiment provides a page display method, which can be applied to one or more of the above terminal devices 101, 102, and 103, and can also be applied to the above server 105. This example embodiment does not make special restrictions on this. Referring to FIG. 2, the page display method may include steps S210 and S220:

Step S210, sending a first request to a server to store a page jump parameter of a parent page, and jumping from the parent page to a child page corresponding to target data, when a query operation for the target data in the parent page is received; and Step S220, sending a second request to the server to obtain the page jump parameter of the parent page, and jumping back to the parent page from the child page according to the page jump parameter.

In the page display method provided in the example embodiment of the present disclosure, when a query operation for the target data in the parent page is received, a first request is sent to a server to store a page jump parameter of a parent page, and jump from the parent page to a child page corresponding to target data; and a second request is sent to the server to obtain the page jump parameter of the parent page, and jump back to the parent page from the child page according to the page jump parameter. On the one hand, in the present disclosure, the server can store the page jump parameter when entering the child page from the parent page, and then obtain the page jump parameter from the server when returning from the child page, and restore the previous parent page according to the page jump parameter, which avoids page refresh caused by page jump, and the user can obtain the last query result without re-operation, thereby improving the user experience. On the other hand, the storage and acquisition of the page jump parameter can be realized through interaction with the server, without using the memory to store data, which reduces memory consumption, thereby improving the display performance of the page.

Below; the above steps of this example implementation are described in more detail.

In step S210, when a query operation for the target data in the parent page is received, a first request is sent to a server to store a page jump parameter of a parent page, and jump from the parent page to a child page corresponding to target data.

In the example implementation of the present disclosure, the page display in a single-page application can be used as an example for explanation, and correspondingly, the parent page can be a list page, and the child page can be a detail page. The single-page application refers to an application with only one main page. When the application runs in a browser, the system only needs to load resources once, and subsequent operation interaction and data interaction are implemented through Router, AJAX (Asynchronous Javascript And XML, which is a web development technology for creating interactive web applications). The list page and the detail page can be user interfaces developed by the Vue-Cli framework. Specifically; the list page can be a user interface in an application for displaying highly repetitive interface elements, and the order, position and data source of each interface element can be controlled by the Vue-Cli framework. The detail page can be a user interface in an application for displaying the detailed content of a certain interface element.

When a user queries the details of a certain piece of data in a list page, it is necessary to enter the query condition related to the data in the list page. In the example implementation of the present disclosure, the query condition may include the filtering condition and paging condition. The filtering condition may be information such as name and type, and the paging condition may be information such as page number and number of data items per page. For example, if a user searches according to the type in a list page, and the filtering condition of the list page is "alarm-Type: 1", it may mean to search for data with an alarm type of type 1 in the list page. If a user searches according to the page number in a list page, and the paging condition of the list page is "pageNum: 2", it may mean to select a certain piece of data in the second page to view details of the data. It should be noted that the list page may include an original list page and an intermediate list page. The original list page may be the initial state of the list page, and the intermediate list page may be a list page with both the filtering condition and the paging condition. For example, after filtering the original list page using a filtering condition (such as alarm-Type: 1), the original list page can be switched to an intermediate list page, i.e., the second page, according to a paging condition (such as pageNum: 2). After selecting a certain piece of data in the second page, it can jump to the detail page of the data. At this time, the corresponding query condition is: "alarmType: 1, pageNum: 2". It can be understood that, the original list page can the first page of data without the filtering condition by default, and the corresponding query condition is "alarmType: ' ', pageNum: 1".

In an example implementation, the parent page can be the original list page or the intermediate list page. That is, the details of the data in the original list page can be queried, and the details of the data in the intermediate list page can also be queried. Taking the query of details of the data in the intermediate list page as an example, when a query operation for the target data in the intermediate list page is received, a request can be sent to the server to store the page jump parameters of the intermediate list page. For example, the page jump parameters can be stored in a database, and jump from the intermediate list page to the detail page corresponding to the target data. The page jump parameter can be the query condition carried by the intermediate list page, the target data can be any list data associated with the detail page in the intermediate list page, the detail page can be the first page displayed when the target data is queried for details, and the request sent to the server can be an http (hypertext transfer protocol) request. For example, the page jump parameter of the intermediate list page can be sent to the server through the first request, such as a "post" request, so that the server stores the received page jump parameters of the intermediate list page in the database.

It should be noted that, before jumping from the parent page to the child page corresponding to the target data, a target file can be pre-configured, and the target file can be used to store the parent-child relationship between all parent pages and child pages. When using the Vue-Cli framework to develop an application, correspondingly, the target file can be a JS (Java Script, a scripting language) file configured in the Vue-store (storage folder). For example, when applied to the page jump function in an application, a pageJumpMemory.js file can be configured in Vue-store. The file is used to describe all pages having the parent-child relationship in the application. The data in the file can form an array of configuration items, and the array can be used as a global variable, which only needs to be loaded once when the project starts to pull all configuration information in the file, and store all the configuration information in the "store" state management, for subsequent global call.

For example, in a web application, the parent-child relationship of all pages in the pageJumpMemory.js file can be configured and stored in the form of a table. When the parent-child relationship in the maintained original table changes, the table can be updated accordingly. For example, if a web application adds a new parent-child relationship page during the iteration process, the new parent-child page can be added to the table, to achieve timely update of the web application. Referring to Table 1, a table for storing the parent-child relationship of pages in the configured pageJumpMemory.js file is schematically given. There are two groups of pages having the parent-child relationship, namely, parent page 1 (path attribute value: /fatherPage1/index) and child page 1 (path attribute value: /fatherPage1/son1), parent page 2 (path attribute value: /fatherPage2/index) and child page 2 (path attribute value: /fatherPage2/son1), and when jumping from parent page 1 to child page 1, it is necessary to memorize the query condition carried by parent page 1, and when jumping from parent page 2 to child page 2, it is not necessary to memorize the query condition carried by parent page 2.

TABLE 1

| parent page | child page | whether need to memorize (Y/N) |
|---|---|---|
| /fatherPage1/index | /fatherPage1/son1 | Y |
| /fatherPage2/index | /fatherPage2/son1 | N |

In order to realize the function of retaining the query conditions carried by the parent page, before jumping from the parent page to the child page corresponding to the target data, the first parameter memory variable, i.e., require-Memory, can also be defined. The first parameter memory variable can be used to mark whether to memorize the page jump parameters of the parent page. For example, if requireMemory=false, it means that the page jump parameters of the parent page do not need to be memorized: if requireMemory=true, it means that the page jump parameters of the parent page need to be memorized, that is, the query conditions carried by the parent page need to be memorized. At the same time, the first navigation guard, i.e., the beforeRouteLeave hook function, can also be defined. The guard can be used to assign values to the path attribute of the parent page and the path attribute of the child page in the first object, and when it is determined that the first object exists in the target file by traversing the target file, a value can be assigned to the first parameter memory variable corresponding to the parent page in the first object. Specifically, when registering the beforeRouteLeave hook function in the parent page, three parameters need to be passed in, i.e., "to", "from", and "next". The parameter to (Route, route attribute) indicates the target route object to be entered, the parameter from (Route, route attribute) indicates the route object that the navigation is about to leave. The route jump is executed by calling the "next" function, and the execution effect depends on the call parameters of the "next" function.

For example, a temporary object temp={fatherPage: ' ', sonPage:' '} can be defined as the first object. Through the beforeRouteLeave hook function, the path attribute value of the parameter "to" can be assigned to temp.son, and the path attribute value of the parameter "from" can be assigned to temp.father. According to the assigned path attribute value, jump from the parent page to the child page, that is, jump from the current page to the target page. Then, the configured pageJumpMemory.js file can be traversed, to determine whether the temp object exists in the file. If the temp object exists in the pageJumpMemory.js file, the first parameter memory variable requireMemory will be assigned to "true": if the temp object does not exist in the pageJumpMemory.js file, the first parameter memory variable requireMemory will be assigned to "false".

In an example implementation, referring to FIG. 3, the jump from the parent page to the child page corresponding to the target data can be implemented according to steps S310 to S330.

Step S310, when the query operation for the target data in the parent page is received, the page jump parameter of the parent page and the first parameter memory variable are obtained.

For example, still take the parent page as the intermediate list page and the child page as the detail page as an example for explanation. For an intermediate list page with both the filtering condition and the paging condition, when a query operation for the target data in the intermediate list page is received, the beforeRouteLeave hook function can be triggered to call the page jump function, and the page jump function can be used to jump from the intermediate list page to the detail page corresponding to the target data. The query operation can be a click/short press operation of the user on the "Details" control on the intermediate list interface, and the present disclosure does not specifically limit this. In the example implementation of the present disclosure, the page jump function can be a toDetails function. When the toDetails function is used to jump from the intermediate list page to the detail page, the page jump parameter carried by the intermediate list page, that is, the query condition, can be stored by the server, so that the query condition can be obtained from the server when returning from the detail page, and the last query result can be restored according to the obtained query condition, which does not require the user to perform a filtering operation on the original list page again, which can improve the user experience.

Specifically, when calling the toDetails function, the first parameter memory variable requireMemory and the page jump parameter "options" carried by the intermediate list page need to be passed in. The "options" is the parameter name and parameter value that need to be memorized when the page jumps, and is an object array type. For example, the query condition is to filter the original list page according to the filtering condition "alarmType is 1", and then switch from the original list page to the intermediate list page according to the paging condition "the second page, each page contains 10 pieces of data", to query the target data in the intermediate list page, the "options" passed in corresponding to the query condition can be {pageNum: 2, pageSize: 10, alarmType: 1}.

Step S320, the page jump parameter is converted to a target parameter string, when it is determined that the first parameter memory variable meets a preset condition by using a page jump function.

After the parameter passing is completed, as shown in FIG. 4, the page jump parameter can be processed according to steps S410 to S430 to store the processed results.

Step S410, the page jump parameter is converted to an initial parameter string, when it is determined that a value of the first parameter memory variable is a target value by using the page jump function.

The page jump function can be used to determine whether the first parameter memory variable "requireMemory" meets the preset condition. For example, the preset condition can be that the first parameter memory variable value is the target value "true", so that the page jump is performed according to the value of requireMemory. When it is determined that requireMemory=true, the page jump parameter can be converted to an initial parameter string. The page jump parameter can be the query condition "options" of the intermediate list page, and the initial parameter string can be the "params" string. It should be noted that, the purpose of converting the page jump parameter to a parameter string is to convert the page jump parameter to the content that can be uniformly recognized by the page jump function, so as to facilitate unified integrated management and operation.

For example, the toDetails function can be used to convert the "options" object to the "params" string. If "options" is {pageNum: 2, pageSize: 10, alarmType: 1}, the converted "params" string can be {"pageNum": 2, "pageSize": 10, "alarmType": 1}, as shown in Table 2.

TABLE 2

| options object | pageNum:2, pageSize:10, alarmType: 1 |
| params string | "pageNum":2, "pageSize":10, " alarmType ": 1 |

Step S420, a first parameter string is obtained by encoding the initial parameter string.

In order to increase the security of the page jump parameter, after converting the page jump parameter to the initial string, the initial string can be encoded to obtain the first parameter string. For example, the toDetails function can be used to convert the "options" object to the "params" string, and the "params" string is the initial parameter string. Then, the "params" string can be encoded by UTF-8 (8-bit Unicode Transformation Format, a variable length character encoding) using the encodeURI function, and the encoded "params" string is the first parameter string. The encodeURI function can encode the string as a URI component. For example, the encoded "params" string can be: "%7Bpage-Num %3Apagesize %22 . . . ", as shown in Table 3.

TABLE 3

| options object | pageNum:2, pageSize:10, alarmType: 1 |
| params string | "pageNum":2, "pageSize":10, " alarmType ": 1 |
| encoded params string | %7BpageNum%3Apagesize%22... |

It can be seen that, the parameter name in the query condition, such as pageNum, pagesize, etc., can be seen from the encoded "params" string, but the parameter value of each parameter cannot be obtained, which can improve the security of the page jump parameter.

Step S430, the target parameter string is obtained by encrypting the first parameter string.

On the basis of increasing the security of the page jump parameter, further, in order to increase the aesthetics of the page jump parameter, the first parameter string obtained by encoding can also be encrypted, to obtain the target parameter string.

For example, first, the toDetails function can be used to convert the "options" object to the "params" string, and the "params" string is the initial parameter string. Then, the encodeURI function can be used to encode the "params" string, and the encoding result of the "params" string can be encrypted. The encoding result of the "params" string can be Base64 encoded, to encrypt the encoding result of the "params" string. It can be understood that, the encryption method can also be MD5 (message-digest algorithm 5), SHA1 (Secure Hash Algorithm 1), Crypto-JS (a JavaScript encryption algorithm), etc., and the present disclosure does not make specific restrictions on this. The encoded "params" string is the first parameter string, and the "params" string obtained by encryption is the target parameter string. For example, the encrypted "params" string can be "cGFnZU51bTo1LCBw . . . ", as shown in Table 4.

TABLE 4

| options object | pageNum:2, pageSize:10, alarmType: 1 |
| params string | "pageNum":2, "pageSize":10, " alarmType ": 1 |
| encoded params string | %7BpageNum%3Apagesize%22... |
| encrypted params string | cGFnZU51bTo1LCBw... |

It can be seen that it is no longer possible to read parameter information related to the query condition from the encrypted "params" string, which further improves the security of the page jump parameter and also increases the aesthetics of the page jump parameter.

In other examples, after the "options" object is converted to the "params" string using the toDetails function, the obtained "params" string can be used as the target parameter string. The converted "params" string can also be directly encrypted, and the encrypted result can be used as the target parameter string. During the encryption process, the "params" string can also be encrypted in multiple layers, such as Base64 encoding, MD5 encryption, and SHA1 encryption is performed successively on the encoded result of the "params" string, to further improve the security of the page jump parameter. Alternatively, the converted "params" string can be encoded, and the encoding result can be directly used as the target parameter string. This disclosure does not specifically limit this.

Step S330, a first request carrying the target parameter string is sent to the server to store the target parameter string in the server, and jump from the parent page to the child page corresponding to the target data.

After obtaining the target parameter string, a first request, such as a "post" request, can be sent to the server, and the "post" request can carry the target parameter string, to send the target parameter string to the server, and the target parameter string is stored by the server, thereby realizing the storage function of the query condition of the intermediate list page. Then, the "next" function can be called through the beforeRouteLeave hook function to perform the page jump according to the path attribute value of the intermediate list page and the path attribute value of the detail page, thereby jumping from the intermediate list page to the detail page corresponding to the target data.

In an example implementation, as shown in FIG. 5, page jump can also be realized according to steps S501 to S506.

Step S501, it is determined whether requireMemory is true. The value of requireMemory is determined by the page jump function toDetails. If requireMemory=true, step S502 is executed, otherwise, step S506 is executed directly.

Step S502, "options" is converted to the "params" string.

Step S503, the "params" string is encrypted.

Step S504, the encrypted "params" string is encoded.

Step S505, the encoded "params" string is sent to the server through a "post" request for storage.

Step S506, jump to the target page.

In the example implementation of the present disclosure, when the vue-cli framework is used to develop a single-page application, it is only necessary to add a page jump function in the parent page source code, to achieve the jump from the parent page to the child page. The page jump parameter can be used to store the query conditions of the parent page when the page jumps, so that the query condition can be obtained when returning from the child page, and the last query result can be restored according to the obtained query condition, without modifying the child page source code, reducing workload of the user and improving page operation efficiency of the user. Moreover, by sending a request to the server, the query condition of the parent page can be stored in the database, without using the memory to store data, reducing consumption of the memory, thereby improving the display performance of the page.

In step S220, a second request is sent to the server to obtain the page jump parameter of the parent page, and jump back to the parent page from the child page according to the page jump parameter.

In the example implementation of the present disclosure, an option variable defaultParams can be defined, and the option variable can be used to save the default value of the page jump parameter. For example, the option variable can be used to save the initial query condition of the list page. If the initial query condition is {pageNum: 1, pageSize: 10}, it means that each page contains ten pieces of data by default, and the data of the first page is taken for display. When entering the list page, defaultParams will be used as the query condition by default and the corresponding list data will be obtained. It can be understood that, when the query condition of the list page is the initial query condition, the initial state of the list page, that is, the original list page, is displayed. When the user queries the details of a certain piece of data in the first page, he can jump from the original list page to the detail page of the data. When returning from the detail page, defaultParams will be used as the query condition. At this time, defaultParams is the initial query condition. According to the initial query condition, the list data of the first page is obtained, that is, the user can jump directly back to the original list page from the detail page.

In the example implementation of the present disclosure, the Vue framework is used to implement the page display of the single-page application. Therefore, before jumping back to the parent page from the child page, that is, before returning to the intermediate list page from the detail page, a second parameter memory variable, that is, hasMemory, can also be defined. The second parameter memory variable can be used to mark whether there is a page jump parameter of the parent page in the target file. For example, if hasMemory=false, it means that the page jump parameter of the parent page does not exist in the target file: if hasMemory=true, it means that the page jump parameter of the parent page exists in the target file, that is, the query condition carried by the parent page exists in the pageJumpMemory.js file. At the same time, a second navigation guard can also be defined, that is, a beforeRouteEnter hook function. The guard can be used to assign a value to the path attribute of the child page and the path attribute of the parent page in the second object, and assign a value to the second parameter memory variable corresponding to the parent page in the second object when it is determined that the second object exists in the target file by traversing the target file. Specifically, when defining the beforeRouteEnter hook function in the parent page, the three parameters "to", "from" and "next" also need to be passed in. The parameter "to" represents the current page, the parameter "from"

represents the last page, and the page jump is executed by calling the "next" function. The execution effect depends on the call parameter of the "next" function.

For example, a temporary object temp2={fatherPage: ' ', sonPage:' '} can be defined as the second object. Through the beforeRouteEnter hook function, the path attribute value of the parameter "to" can be assigned to temp2.son, and the path attribute value of the parameter "from" can be assigned to temp2.father. According to the assigned path attribute value, it can jumped back to the parent page from the child page, that is, jump from the current page to the previous page. Then, the configured pageJumpMemory.js file can be traversed, to determine whether the temp2 object exists in the file. If the temp2 object exists in the pageJumpMemory.js file, the second parameter memory variable hasMemory will be assigned to "true": if the temp2 object does not exist in the pageJumpMemory.js file, the second parameter memory variable hasMemory will be assigned to "false".

When a user queries details of a certain piece of data in the intermediate list page, he can jump from the intermediate list page to the detail page of the data. When returning from the detail page, defaultParams will be used as the query condition. According to the initial query condition, the list data of the original list page is obtained, that is, the user can jump back to the original list page from the detail page. When the user views the details of the target data in the detail page and returns from the detail page, in order to avoid losing the last query result caused by returning from the details page to the original list page due to the page refresh, the parameter parsing function can be called, and the parameter parsing function can be used to return from the detail page to the list page which retains the last query result, that is, return to the intermediate list page. In the example implementation of the present disclosure, the parameter parsing function can be a getMemory Params function. For example, when a trigger operation of the page back control in the browser interface by the user is received, the beforeRouteEnter hook function can be triggered to call the getMemory Params function, and the getMemory Params function can be used to complete the acquisition and parsing of the last query condition before entering the list page, so as to facilitate the modification of the value of defaultParams according to the parsing result, and then restore the last query result, without the user to filter the list page again, etc., thereby improving the user experience.

For example, when returning to the intermediate list page from the detail page, the beforeRouteEnter hook function can be used to call the getMemory Params function before entering the intermediate list page, and a request can be sent to the server through the getMemory Params function to obtain the page jump parameter of the intermediate list page, and return to the intermediate list page from the detail page according to the page jump parameter. The request sent to the server can be a "http" request, such as a second request, such as a "get" request, can be sent to the server, so that the server returns the page jump parameter of the intermediate list page.

In an example implementation, as shown in FIG. 6, according to steps S610 to S630, jumping from a child page back to a parent page that retains the last query result can be achieved, for example, jumping back to an intermediate list page from a detail page.

Step S61, a second request is sent to the server to obtain the target parameter string from the server, when it is determined that a value of the second parameter memory variable is a target value by using a parameter parsing function.

Specifically, when calling the getMemory Params function, parameters for extracting the last query condition can be passed in, including parameters "reg", "to", "from", and "next". "Reg" is a regular expression, and "reg" can be used to match the detail page URL corresponding to the current list page. The "to", "from", and "next" can be obtained from the beforeRouteEnter hook function. Both "to" and "from" are object type data. The information of the list page can be obtained through "to", and the information of the page before entering the list page can be obtained through "from". The "next" is a jump function. The beforeRouteEnter hook function requires that the "next" function must be called after execution of the business code is completed, to mark the completion of the function and enter the page loading process.

After the parameter passing is completed, the getMemory Params function can be used to obtain the target parameter string. For example, when returning from the detail page, the getMemory Params function can be used first to check whether the query condition of the intermediate list page is stored in the database. For example, when the second parameter memory variable value hasMemory is the target value "true", it indicates that the page jump parameter of the intermediate list page exists in the database, and then a second request, such as a "get" request, can be sent to the server to obtain the target parameter string from the server. It can be understood that, if the intermediate list page and the detail page do not exist in the pageJumpMemory.js file, that is, when hasMemory=false, it can indicate that the page jump is not the jump back to the intermediate list page from the specified detail page, or the page jump parameter of the intermediate list page does not exist in the database. At this time, "next ( )" can be directly executed to enter the list page, that is, return to the initial state of the list page.

Step S620, the first parameter string is obtained by decrypting the target parameter string.

After obtaining the target parameter string from the server, the target parameter string can be parsed, to obtain the page jump parameter. For example, when jumping from the intermediate list page to the detail page, the "options" object is converted into the "params" string firstly, and then the encodeURI function is used to encode the "params" string, and the encoding result of the "params" string is Base64 encoded, and the "params" string "cGFnZU51bTo1LCBw . . . " is obtained by encrypting the encoding result of the "params" string. Correspondingly, when parsing the "params" string "cGFnZU51bTo1LCBw . . . ", the "params" string "cGFnZU51bTo1LCBw . . . " can be Base64 decrypted firstly, to obtain the decrypted "params" string "%7Bpage-Num %3Apagesize %22 . . . ". The string is the first parameter string, so as to facilitate the subsequent decoding of the first parameter string, to obtain the initial parameter string, and convert the initial parameter string to the page jump parameter.

Step S630, the initial parameter string is obtained by decoding the first parameter string, and the initial parameter string is converted to the page jump parameter of the parent page.

After the first parameter string is obtained, the first parameter string can be decoded to obtain the initial parameter string, and the initial parameter string can be converted to the page jump parameter of the intermediate list page. For example, the decodeURI function can be used to decode the decrypted "params" string "%7BpageNum %3Apagesize %22 . . . ", and the decoded "params" string {"pageNum": 2, "pageSize": 10, "alarmType": 1} is the initial parameter string. Then, the "params" string can be restored to the object type data, i.e, options {pageNum: 2, pageSize: 10, alarmType: 1}.

In other examples, if the target parameter string is the "params" string "%7BpageNum %3Apagesize %22 . . . ", the decodeURI function can be used firstly to decode the "params" string "%7BpageNum %3Apagesize %22 . . . ", to obtain the decoded "params" string {"pageNum": 2, "pageSize": 10, "alarmType": 1}. Then, the decoded "params" string can be restored to the object type data, i.e., options {pageNum: 2, pageSize: 10, alarmType: 1}. If the target parameter string is the "params" string {"pageNum": 2, "pageSize": 10, "name": "name1", "type": "type1"}, the "params" string can be directly restored to the object type data, i.e., options {pageNum: 2, pageSize: 10, name: 'name1', type: 'type1'}, which is not limited in the present disclosure.

Step S640, jump back to the parent page from the child page according to the page jump parameter.

After extracting the page jump parameter, the current value of the page jump parameter can be assigned to the option variable "defaultParams", so as to jump back to the intermediate list page from the detail page according to the assigned option variable. For example, after the assignment is completed, the option variable "defaultParams" changes from the initial query condition {pageNum: 1, pageSize: 10} to options {pageNum: 2, pageSize: 10, alarmType: 1}, and enters the intermediate list page by calling and executing next ( ), that is, achieves the jump back to the list page that retains the last query result from the detail page.

It should be noted that after jumping back to the list page that retains the last query result from the detail page according to the page jump parameter, the page jump parameter stored in the database can be deleted, so that there is only 0 or 1 record in the database table, which greatly reduces the storage pressure of the database. For example, the page jump parameter can be deleted through a "delete" request. The specific implementation method of deleting the page jump parameter can be changed according to the specific implementation scenario, and the present disclosure does not specifically limit this.

In this example, when using the Vue-cli framework to develop a single-page application, it is only need to add a parameter parsing function in the parent page source code, to realize jumping from the child page back to the parent page that retains the last query result. When returning from the child page, the parent page query result is restored by reading the previously recorded query conditions, without modifying the child page source code, which reduces workload of the user and improves page operation efficiency of the user.

Figure 7:
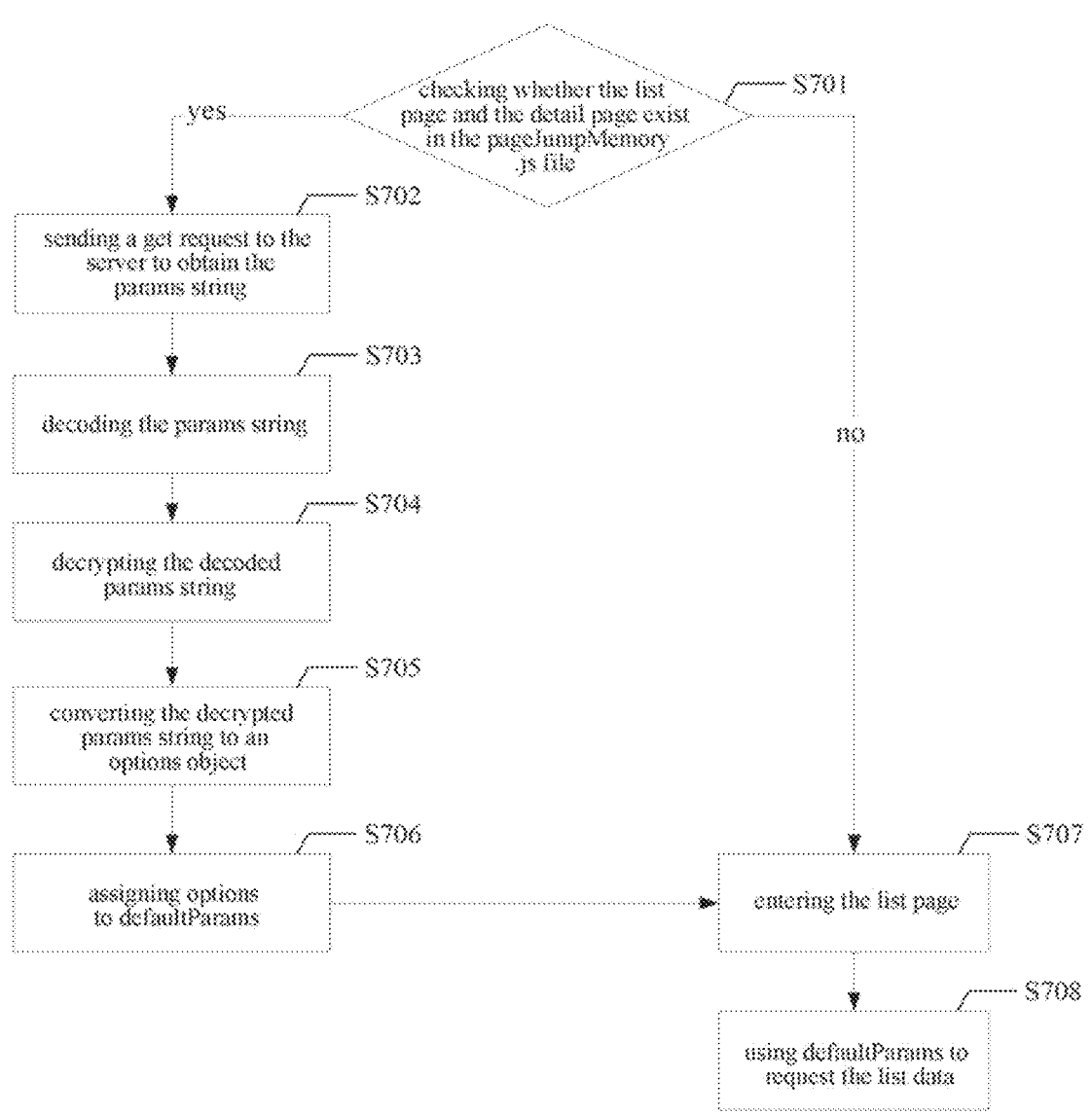
FIG. 7 schematically shows a flow chart of obtaining page jump parameters when a page returns according to another embodiment of the present disclosure.

In an example implementation, as shown in FIG. 7, the jump from the detail page back to the list page can be realized according to steps S701 to S708.

Step S701, it is checked whether the list page and the detail page exist in the pageJumpMemory.js file. If yes, execute step S702. If no, this page jump is not the jump from the specified detail page back to the intermediate list page, or the page jump parameter of the intermediate list page does not exist in the database, execute step S707;

step S702, a "get" request is sent to the server to obtain the "params" string;

step S703, the "params" string is decoded;

step S704, the decoded "params" string is decrypted;

step S705, the decrypted "params" string is converted to an "options" object;

step S706, "options" is assigned to defaultParams;

step S707, enter the list page, such as executing next ( ) to enter the list page;

step S708, use defaultParams to request the list data, render the list data and display it to the user through the terminal device.

In the example implementation of the present disclosure, two steps are required to realize that the last query result can be retained when returning to the list page from the detail page. Firstly, before leaving the list page, call the page jump function (such as toDetails function) in the beforeRouterLeave hook function of the list page to determine whether the query condition of the current page needs to be memorized, and if it needs to be memorized, a "post" request is sent to the server to store the query condition. The query condition has been base64 encoded before sending the "post" request to the server, which can ensure the security of the request. Secondly, before entering the list page, call the parameter parsing function (such as getMemory Params function) in the beforeRouteEnter hook function of the list page to determine whether the query condition for the list page exists. If yes, send a "get" request to the server to obtain the query condition, read and parse the obtained query condition, obtain the last query condition "options", and modify the default query condition of the page, that is, the option variable defaultParams, as the last query condition "options", to complete the recovery of the last query result of the list page. This method only needs to add the page jump function and the parameter parsing function in the source codes of the list page, without modifying the source codes of the detail page, reducing the workload required by the user to complete the function and improving operating efficiency of the user. In addition, the storage and acquisition of page jump parameter are realized based on the "http" request, thereby realizing the function of retaining and acquiring the last query condition, without using memory to store data, reducing memory consumption, and thus improving the display performance of the page.

Figures 8, 9A:
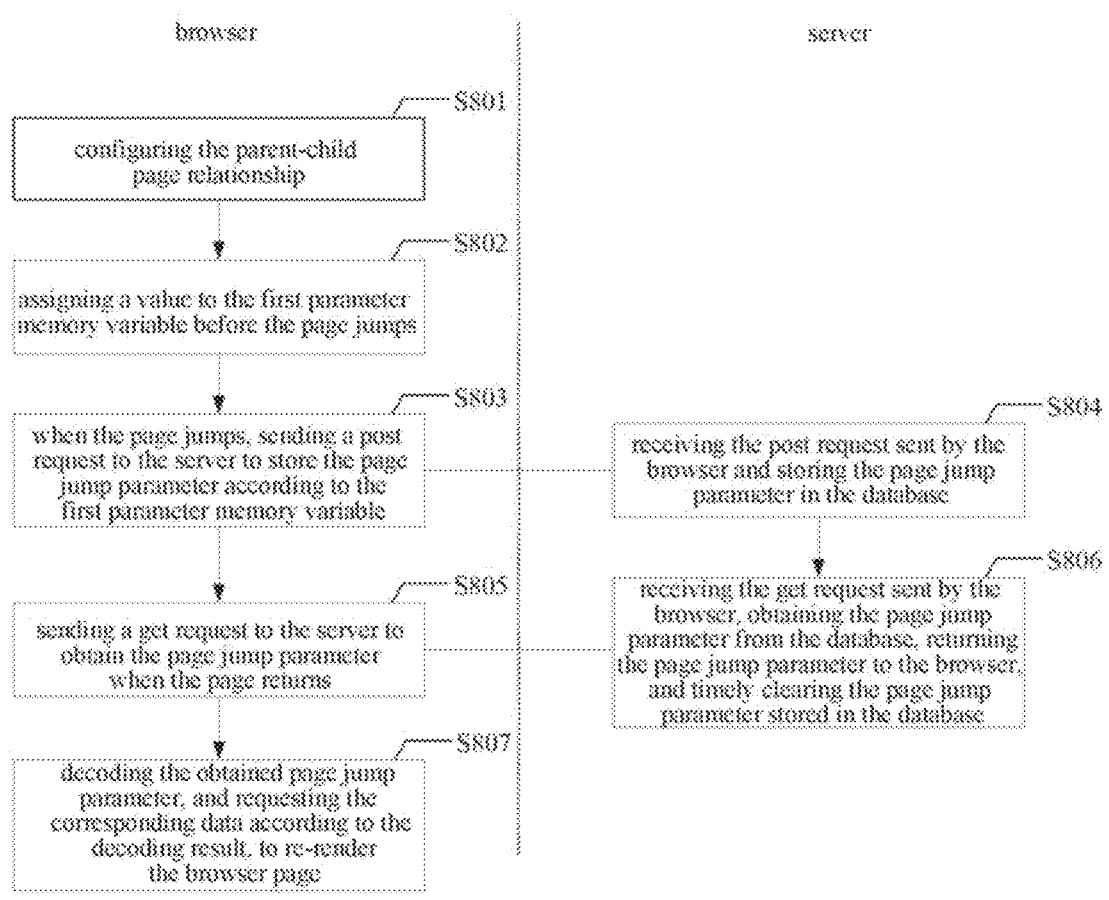
FIG. 8 schematically shows a complete flow chart of a page display method according to an embodiment of the present disclosure.
FIG. 9A schematically shows a schematic diagram of an original list page according to an embodiment of the present disclosure.

In an example implementation, referring to FIG. 8, the page display can be performed according to steps S801 to S807.

Step S801, the parent-child page relationship is configured. The pageJumpMemory.js file is configured in the Vue-store of the browser, to store and maintain the parent-child relationship page, and the page jump parameter of whether the parent page needs to be memorized.

Step S802, before the page jumps, a value is assigned to the first parameter memory variable. It is determined whether the current page and the target page exist in the pageJumpMemory.js file. If yes, "true" is assigned to the first parameter memory variable, otherwise, "false" is assigned to the first parameter memory variable.

Step S803, when the page jumps, a "post" request is sent to the server to store the page jump parameter according to the first parameter memory variable. When the value of the first parameter memory variable is "true", the encoded page jump parameter can be sent to the server through a "post" request, so that the server stores the page jump parameter in the database.

Step S804, the server receives the "post" request sent by the browser and stores the page jump parameter in the database.

Step S805, when the page returns, a "get" request is sent to the server to obtain the page jump parameter.

Step S806, the server receives the "get" request sent by the browser, obtains the page jump parameter from the database, returns the page jump parameter to the browser, and timely clears the page jump parameter stored in the database.

Step S807, the obtained page jump parameter is decoded, and the corresponding data is requested according to the decoding result, to re-render the browser page.

In this example, on the one hand, in the present disclosure, the server can store the page jump parameter when entering the child page from the parent page, and then obtain the page jump parameter from the server when returning from the child page, and restore the previous parent page according to the page jump parameter, which avoids page refresh caused by page jump, and the user can obtain the last query result without re-operation, thereby improving the user experience. On the other hand, the storage and acquisition of the page jump parameter can be realized through interaction with the server, without using the memory to store data, which reduces memory consumption, thereby improving the display performance of the page.

Referring to FIG. 9A, a list page displayed at runtime by an application for operation and maintenance service is schematically shown. It can be seen that FIG. 9A shows the initial state of the list page, that is, the original list page, and the corresponding query condition is "name: ' ', pageNum: 1", that is, the first page of data without filtering conditions. The list page includes 6 pieces of list data, each of which includes a work order number, a work order name, and a work order status. For example, the first piece of list data is a test work order with a work order number of 202101, and the current status of the work order is "resolved". It can be understood that, each piece of list data in the list page can be used as target data. When the user selects a certain piece of list data, that is, when a certain work order is selected, the "view details" operation corresponding to the work order can be executed to enter the detail page of the work order from the current list page. For example, when "view details" is clicked, the beforeRouteLeave hook function can be triggered, and the toDetails function can be called through the beforeRouteLeave hook function, so that the query condition of the current list page can be stored through the server when the toDetails function is used to jump from the current list page to the detail page of the work order. In the embodiment, "work order number", "work order name" and "work order status" can all be used as the filtering condition, and the page number and 6 pieces of data per page can be used as the paging condition. In addition, the user can also directly select the target page number to go to the corresponding intermediate list page.

For example, when the user enters the work order name "No Intrusion", the search button can be clicked to filter 100 pieces of list data. After the filtering is completed, the list page where the "No Intrusion" work order is located can be displayed to the user. Referring to FIG. 9B, a list page with the filtering condition and the paging condition, that is, the intermediate list page, is schematically shown. It can be seen that, the query condition corresponding to the list page is "name: No Intrusion, pageNum: 6", and the 6 pieces of list data in FIG. 9B are all No Intrusion work orders, and each piece of list data can be used as target data. When a user performs a view detail operation on a certain piece of list data, the user can jump from the list page shown in FIG. 9B to the detail page corresponding to the list data. For example, when a user selects a No Intrusion work order with a work order number of 202131 and performs a view detail operation, the user can enter the detail page of the work order from the current list page, such as the detail page shown in FIG. 9C. The detail page includes 6 items of detail data, namely, the work order name, work order number, work order status, creator, creator contact information, creation time, and related pictures.

When returning from the detail page shown in FIG. 9C, the user can return to the list page shown in FIG. 9B and directly display the list data of page 6 with the filtering condition of "No Intrusion" to the user, without returning to the list page shown in FIG. 9A. For example, when the "back" operation is clicked, the beforeRouteEnter hook function can be triggered, and the getMemory Params function can be called through the beforeRouteEnter hook function, to obtain the page jump parameter of the list page shown in FIG. 9B from the server using the getMemory Params function, and the list data and rendering page can be re-requested according to the page jump parameter. When returning from the detail page to the list page, the last query result can be retained, which is convenient for users to view and improves the user experience.

It can be understood that, when the user performs a detail viewing operation of a certain piece of list data in FIG. 9A, he can jump from the list page shown in FIG. 9A to the detail page corresponding to the list data. When returning from the detail page, he can jump back to the list page shown in FIG. 9A, that is, return to the initial state of the list page, which also realizes the function of retaining the last query result when returning from the detail page to the list page.

It should also be noted that, in the example implementation of the present disclosure, the beforeRouteLeave hook function, beforeRouteEnter hook function, page jump function, parameter parsing function and option variable can be encapsulated as an executable file in advance and stored in the browser, so that the executable file can be executed when a query operation on the target data in the list page is received. The executable file can also include source codes such as parameters "to", "reg", "from" and "next", as well as algorithm source codes for encoding and encryption. That is, the source codes can be encapsulated according to the actual needs of the user and the executable file required by the user can be obtained. The present disclosure does not make specific limitations on this. For example, webpack (a module packager) can be used under the Vue framework to package the list page source code, detail page source code, page jump function, parameter parsing function, option variable and other related source codes, and store them in the form of folders in the server. When the user uses them at the local browser, he can make a data request to the server, to request the page jump function, parameter parsing function, option variable defaultParams, parameters "to", "reg", "from" and "next", encodeURI function and decodeURI and other related source codes involved in this disclosure. Preferably, when the user visits the list page for the first time, the pre-packaged executable files can be deployed to the local browser together, which can avoid frequent data requests to the server. The page display method provided by the example implementation of the present disclosure has clear logic, simple architecture, lightweight, easiness to implement, and does not occupy too much memory. It can be understood that, the page display method refers to data processing at the browser side.

It should be noted that the parent-child pages in the example implementation of the present disclosure include but are not limited to the list page and the detail page, that is, the parent-child pages can be any two pages in the page display scenario by storing and obtaining the page jump parameters, and the present disclosure does not specifically limit this.

In the page display method provided in the example embodiment of the present disclosure, when a query operation for the target data in the parent page is received, a first request is sent to a server to store a page jump parameter of a parent page, and jump from the parent page to a child page corresponding to target data; and a second request is sent to the server to obtain the page jump parameter of the parent page, and jump back to the parent page from the child page according to the page jump parameter. On the one hand, in the present disclosure, the server can store the page jump parameter when entering the child page from the parent page, and then obtain the page jump parameter from the server when returning from the child page, and restore the previous parent page according to the page jump parameter, which avoids page refresh caused by page jump, and the user can obtain the last query result without re-operation, thereby improving the user experience. On the other hand, the storage and acquisition of the page jump parameter can be realized through interaction with the server, without using the memory to store data, which reduces memory consumption, thereby improving the display performance of the page.

It should be noted that although the steps of the method in the present disclosure are described in a specific order in the accompanying drawings, this does not require or imply that these steps must be performed in this specific order, or that all the steps shown must be performed to achieve the desired result. In addition or alternatively, some steps can be omitted, multiple steps can be combined into one step for execution, and/or one step can be decomposed into multiple steps for execution, etc.

Figure 10:
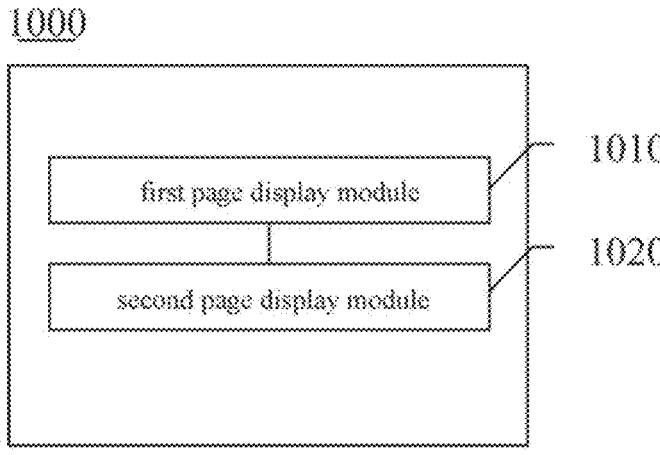
FIG. 10 schematically shows a block diagram of a page display apparatus according to an embodiment of the present disclosure.

Further, in this example implementation, a page display apparatus is also provided. The apparatus can be applied to a terminal device or a server. Referring to FIG. 10, the page display apparatus 1000 may include a first page display module 1010 and a second page display module 1020.

The first page display module 1010 is configured to send a first request to a server to store a page jump parameter of a parent page, and jump from the parent page to a child page corresponding to target data, when a query operation for the target data in the parent page is received.

The second page display module 1020 is configured to send a second request to the server to obtain the page jump parameter of the parent page, and jump back to the parent page from the child page according to the page jump parameter.

In an optional embodiment, the page display apparatus 1000 further includes:

a file configuration module, used to configure a target file, wherein the target file is configured to store a parent-child relationship between the parent page and the child page.

In an optional embodiment, the page display apparatus 1000 further includes:

a first variable definition module, used to define a first parameter memory variable, wherein the first parameter memory variable is configured to mark whether to memorize the page jump parameter of the parent page;

a first guard definition module, used to define a first navigation guard, wherein the first navigation guard is configured to assign values to a path attribute of the child page and a path attribute of the parent page in a first object, and assign a value to the first parameter memory variable corresponding to the parent page in the first object when it is determined that the first object exists in the target file by traversing the target file.

In an optional embodiment, the first page display module 1010 includes:

a parameter acquisition unit, used to acquire the page jump parameter of the parent page and the first parameter memory variable, when the query operation for the target data in the parent page is received;

a parameter conversion unit, used to convert the page jump parameter to a target parameter string, when it is determined that the first parameter memory variable meets a preset condition by using a page jump function;

a parameter storage unit, used to send a first request carrying the target parameter string to the server to store the target parameter string in the server, and jump from the parent page to the child page corresponding to the target data.

In an optional embodiment, the parameter conversion unit includes:

a parameter conversion sub-unit, used to convert the page jump parameter to an initial parameter string, when it is determined that a value of the first parameter memory variable is a target value by using the page jump function;

a string encoding sub-unit, used to obtain a first parameter string by encoding the initial parameter string;

a string encryption sub-unit, used to obtain the target parameter string by encrypting the first parameter string.

In an optional embodiment, the page display apparatus 1000 also includes:

a second variable definition module, used to define a second parameter memory variable, wherein the second parameter memory variable is configured to mark whether the page jump parameter of the parent page exists in the target file;

a second guard definition module, used to define a second navigation guard, wherein the second navigation guard is configured to assign values to a path attribute of the child page and a path attribute of the parent page in a second object, and assign a value to the second parameter memory variable corresponding to the parent page in the second object when it is determined that the second object exists in the target file by traversing the target file.

In an optional embodiment, the second page display module 1020 includes:

a string acquisition unit, used to send a second request to the server to obtain the target parameter string from the server, when it is determined that a value of the second parameter memory variable is a target value by using a parameter parsing function;

a string decryption unit, used to obtain the first parameter string by decrypting the target parameter string;

a string decoding unit, used to obtain the initial parameter string by decoding the first parameter string, and converting the initial parameter string to the page jump parameter of the parent page;

a page jump unit, used to jump back to the parent page from the child page according to the page jump parameter.

In an optional embodiment, the page jump unit includes:

a parameter assignment sub-unit, used to assign a current value of the page jump parameter to an option variable, wherein the option variable is configured to save a default value of the page jump parameter;

a page jump sub-unit, used to jump back to the parent page from the child page according to the assigned option variable.

The specific details of each module in the above-mentioned page display apparatus have been described in detail in the corresponding page display method, which will not be repeated herein.

Each module in the above apparatus can be a general processor, including: a central processing unit, a network processor, etc.: it can also be a digital signal processor, an application-specific integrated circuit, a field programmable gate array or other programmable logic device, a discrete gate or transistor logic device, a discrete hardware component. Each module can also be implemented in the form of software, firmware, etc. Each processor in the above apparatus can be an independent processor or integrated together.

The example embodiment of the present disclosure also provides a computer-readable storage medium on which a program product capable of implementing the above method of the present specification is stored. In some possible embodiments, various aspects of the present disclosure can also be implemented in the form of a program product, which includes a program code. When the program product is run on an electronic device, the program code is used to enable the electronic device to perform the steps according to various example embodiments of the present disclosure described in the above "DETAILED DESCRIPTION" section of the present specification. The program product can use a portable compact disk read-only memory (CD-ROM) and include a program code, and can be run on an electronic device, such as a personal computer. However, the program product of the present disclosure is not limited to this. In this document, the readable storage medium can be any tangible medium containing or storing a program, which can be used by or in combination with an instruction execution system, apparatus, or device.

The program product can use any combination of one or more readable media. The readable medium may be a readable signal medium or a readable storage medium. The readable storage medium may be, for example, but not limited to, an electrical, magnetic, optical, electromagnetic, infrared, or semiconductor system, apparatus or device, or any combination thereof. More specific examples of readable storage media (a non-exhaustive list) include: an electrical connection having one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

A computer readable signal medium may include a data signal propagated in baseband or as part of a carrier wave, carrying a readable program code. Such propagated data signals may take a variety of forms, including but not limited to electromagnetic signals, optical signals, or any suitable combination thereof. A readable signal medium may also be any readable medium other than a readable storage medium. The readable medium can send, propagate, or transmit a program for use by or in conjunction with an instruction execution system, apparatus, or device.

The program code contained on the readable medium may be transmitted using any appropriate medium, including but not limited to wireless, wired, optical cable, RF, etc., or any suitable combination of the above.

The program code for performing the operations of the present disclosure may be written in any combination of one or more programming languages, including object-oriented programming languages, such as Java, C++, etc., and conventional procedural programming languages, such as "C" language or similar programming languages. The program code may be executed entirely on the user computing device, partially on the user device, as a separate software package, partially on the user computing device and partially on a remote computing device, or entirely on a remote computing device or server. In the case of a remote computing device, the remote computing device may be connected to the user computing device via any type of network, including a local area network (LAN) or a wide area network (WAN), or may be connected to an external computing device (e.g., using an Internet service provider to connect via the Internet).

The example embodiment of the present disclosure also provides an electronic device capable of implementing the above method. The electronic device 1100 according to this example embodiment of the present disclosure is described below with reference to FIG. 11. The electronic device 1100 shown in FIG. 11 is only an example and should not impose any limitations on the functions and scope of use of embodiments of the present disclosure.

Figure 11:
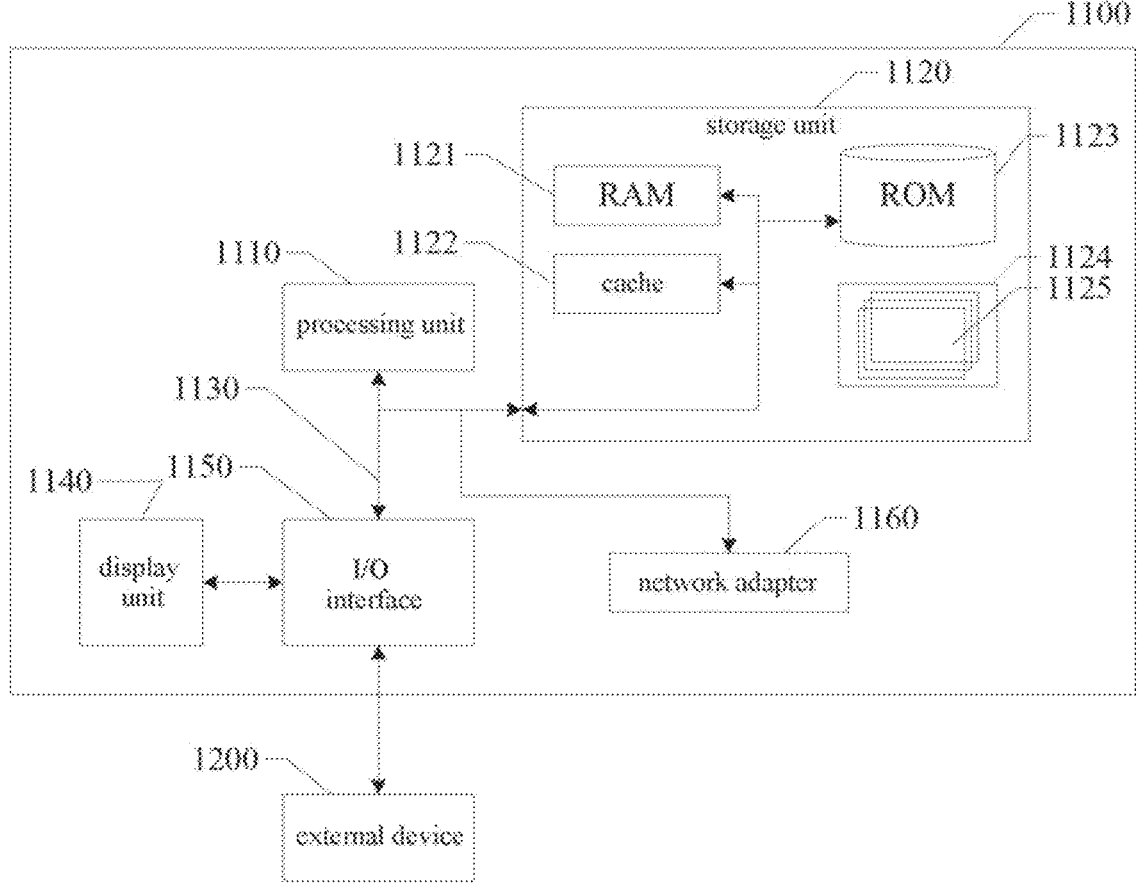
FIG. 11 schematically shows a structural diagram of a computer system suitable for implementing an electronic device of an embodiment of the present disclosure.

As shown in FIG. 11, the electronic device 1100 may be in the form of a general computing device. The components of the electronic device 1100 may include, but are not limited to: at least one processing unit 1110, at least one storage unit 1120, a bus 1130 connecting different system components (including the storage unit 1120 and the processing unit 1110), and a display unit 1140.

The storage unit 1120 stores program codes, which can be executed by the processing unit 1110, so that the processing unit 1110 performs the steps according to various example embodiments of the present disclosure described in the above "DETAILED DESCRIPTION" section of this specification. For example, the processing unit 1110 may perform any one or more of the method steps in FIG. 2 to FIG. 8.

The storage unit 1120 may include a readable medium in the form of a volatile storage unit, such as a random access storage unit (RAM) 1121 and/or a cache storage unit 1122, and may further include a read-only storage unit (ROM) 1123.

The storage unit 1120 may also include a program/utility 1124 having a set (at least one) of program modules 1125, such program modules 1125 including but not limited to: an operating system, one or more application programs, other program modules, and program data, each of which or some combination may include the implementation of a network environment.

The bus 1130 may represent one or more of several types of bus structures, including a storage unit bus or storage unit controller, a peripheral bus, a graphics acceleration port, a processing unit, or a local bus using any of a variety of bus structures.

The electronic device 1100 may also communicate with one or more external devices 1200 (e.g., a keyboard, a pointing device, a Bluetooth device, etc.), one or more devices that enable a user to interact with the electronic device 1100, and/or any device that enables the electronic device 1100 to communicate with one or more other computing devices (e.g., a router, a modem, etc.). Such communication may be performed via an input/output (I/O) interface 1150. Furthermore, the electronic device 1100 can also communicate with one or more networks (such as a local area network (LAN), a wide area network (WAN) and/or a public network, such as the Internet) through a network adapter 1160. As shown in the figure, the network adapter 1160 communicates with other modules of the electronic device 1100 through the bus 1130. It should be understood that, although not shown in the figure, other hardware and/or software modules can be used in conjunction with the electronic device 1100, including but not limited to: microcode, device drivers, redundant processing units, external disk drive arrays, RAID systems, tape drives, and data backup storage systems.

Through the description of the above implementation, it is easy for those skilled in the art to understand that the example implementation described here can be implemented by software or by combining software with necessary hardware. Therefore, the technical solution according to the implementation of the present disclosure can be embodied in the form of a software product, which can be stored in a non-transitory storage medium (which can be a CD-ROM, a USB flash drive, a mobile hard disk, etc.) or on a network, and includes several instructions to enable a computing device (which can be a personal computer, a server, a terminal device, or a network device, etc.) to execute the method according to the example implementation of the present disclosure.

In addition, the above-mentioned figures are only schematic illustrations of the processes included in the method according to the example embodiment of the present disclosure, and are not intended to be limiting. It is easy to understand that the processes shown in the above-mentioned figures do not indicate or limit the time sequence of these processes. In addition, it is also easy to understand that these processes can be performed synchronously or asynchronously, for example, in multiple modules.

It should be noted that although several modules or units of the device for action execution are mentioned in the above detailed description, this division is not mandatory. In fact, according to the embodiment of the present disclosure, the features and functions of two or more modules or units described above can be embodied in one module or unit. Conversely, the features and functions of one module or unit described above can be further divided and embodied by multiple modules or units.

It should be understood that the present disclosure is not limited to the precise structure described above and shown in the drawings, and various modifications and changes can be made without departing from its scope. The scope of the present disclosure is limited only by the appended claims.

The invention claimed is:

1. A page display method, comprising:
sending, by a terminal device, a first request to a server, and jumping from displaying, on a display screen of the terminal device, a parent page to displaying, on the display screen of the terminal device, a child page corresponding to target data, in response to determining that the terminal device receives, from a user, a query operation for the target data in the parent page displayed on the display screen of the terminal device, wherein the first request carries a page jump parameter of the parent page and is configured to request the server to store the page jump parameter of the parent page in a database of the server; and
sending, by the terminal device, a second request to the server to obtain the page jump parameter of the parent page stored in the database of the server, receiving the page jump parameter of the parent page from the server, and jumping from displaying, on the display screen of the terminal device, the child page back to displaying, on the display screen of the terminal device, the parent page according to the page jump parameter.

2. The page display method according to claim 1, wherein before jumping from displaying, on a display screen of the terminal device, the parent page to displaying, on the display screen of the terminal device, a child page corresponding to target data, the method further comprises:
configuring a target file, wherein the target file is configured to store a parent-child relationship between the parent page and the child page.

3. The page display method according to claim 2, wherein before jumping from displaying, on a display screen of the terminal device, the parent page to displaying, on the display screen of the terminal device, a child page corresponding to target data, the method further comprises:
defining a first parameter memory variable, wherein the first parameter memory variable is configured to mark whether to memorize the page jump parameter of the parent page;
defining a first navigation guard, wherein the first navigation guard is configured to assign values to a path attribute of the child page and a path attribute of the parent page in a first object, and assign a value to the first parameter memory variable corresponding to the parent page in the first object in response to determining that the first object exists in the target file by traversing the target file.

4. The page display method according to claim 3, wherein sending, by a terminal device, a first request to a server, and jumping from displaying, on a display screen of the terminal device, the parent page to displaying, on the display screen of the terminal device, a child page corresponding to target data comprises:
obtaining the page jump parameter of the parent page and the first parameter memory variable, in response to determining that the query operation for the target data in the parent page is received;
converting the page jump parameter to a target parameter string, in response to determining that the first parameter memory variable meets a preset condition by using a page jump function;
sending a first request carrying the target parameter string to the server to store the target parameter string in the server, and jumping from the parent page to the child page corresponding to the target data.

5. The page display method according to claim 4, wherein converting the page jump parameter to a target parameter string, in response to determining that the first parameter memory variable meets a preset condition by using a page jump function, comprises:
converting the page jump parameter to an initial parameter string, in response to determining that a value of the first parameter memory variable is a target value by using the page jump function;
obtaining a first parameter string by encoding the initial parameter string;
obtaining the target parameter string by encrypting the first parameter string.

6. The page display method according to claim 2, wherein before jumping from displaying, on a display screen of the terminal device, the parent page to displaying, on the display screen of the terminal device, a child page corresponding to target data, the method further comprises:
defining a second parameter memory variable, wherein the second parameter memory variable is configured to mark whether the page jump parameter of the parent page exists in the target file;
defining a second navigation guard, wherein the second navigation guard is configured to assign values to a path attribute of the child page and a path attribute of the parent page in a second object, and assign a value to the second parameter memory variable corresponding to the parent page in the second object in response to determining that the second object exists in the target file by traversing the target file.

7. The page display method according to claim 6, wherein sending, by the terminal device, a second request to the server to obtain the page jump parameter of the parent page stored in the database of the server, receiving the page jump parameter of the parent page from the server, and jumping from displaying, on the display screen of the terminal device, the child page back to displaying, on the display screen of the terminal device, the parent page according to the page jump parameter comprises:

sending a second request to the server to obtain the target parameter string from the server, in response to determining that a value of the second parameter memory variable is a target value by using a parameter parsing function;

obtaining the first parameter string by decrypting the target parameter string;

obtaining the initial parameter string by decoding the first parameter string, and converting the initial parameter string to the page jump parameter of the parent page;

jumping back to the parent page from the child page according to the page jump parameter.

8. The page display method according to claim 7, wherein jumping from displaying, on the display screen of the terminal device, the child page back to displaying, on the display screen of the terminal device, the parent page according to the page jump parameter comprises:

assigning a current value of the page jump parameter to an option variable, wherein the option variable is configured to save a default value of the page jump parameter;

jumping back to the parent page from the child page according to the assigned option variable.

9. A page display apparatus, comprising:

a processor; and a memory, configured to store executable instructions of the processor, wherein the processor is configured to cause a terminal device to:

send a first request to a server, and jump from displaying, on a display screen of the terminal device, a parent page to displaying, on the display screen of the terminal device, a child page corresponding to target data, in response to determining that the terminal device receives, from a user, a query operation for the target data in the parent page displayed on the display screen of the terminal device, wherein the first request carries a page jump parameter of the parent page and is configured to request the server to store the page jump parameter of the parent page in a database of the server; and send a second request to the server to obtain the page jump parameter of the parent page stored in the database of the server, receive the page jump parameter of the parent page from the server, and jump from displaying, on the display screen of the terminal device, the child page back to displaying, on the display screen of the terminal device, the parent page according to the page jump parameter.

10. The page display apparatus according to claim 9, wherein the processor is further configured to:

configure a target file, wherein the target file is configured to store a parent-child relationship between the parent page and the child page.

11. The page display apparatus according to claim 10, wherein the processor is further configured to:

define a first parameter memory variable, wherein the first parameter memory variable is configured to mark whether to memorize the page jump parameter of the parent page;

define a first navigation guard, wherein the first navigation guard is configured to assign values to a path attribute of the child page and a path attribute of the parent page in a first object, and assign a value to the first parameter memory variable corresponding to the parent page in the first object in response to determining that the first object exists in the target file by traversing the target file.

12. The page display apparatus according to claim 11, wherein the processor is further configured to:

obtain the page jump parameter of the parent page and the first parameter memory variable, in response to determining that the query operation for the target data in the parent page is received;

convert the page jump parameter to a target parameter string, in response to determining that the first parameter memory variable meets a preset condition by using a page jump function;

send a first request carrying the target parameter string to the server to store the target parameter string in the server, and jumping from the parent page to the child page corresponding to the target data.

13. The page display apparatus according to claim 12, wherein the processor is further configured to:

convert the page jump parameter to an initial parameter string, in response to determining that a value of the first parameter memory variable is a target value by using the page jump function;

obtain a first parameter string by encoding the initial parameter string;

obtain the target parameter string by encrypting the first parameter string.

14. The page display apparatus according to claim 10, wherein the processor is further configured to:

define a second parameter memory variable, wherein the second parameter memory variable is configured to mark whether the page jump parameter of the parent page exists in the target file;

define a second navigation guard, wherein the second navigation guard is configured to assign values to a path attribute of the child page and a path attribute of the parent page in a second object, and assign a value to the second parameter memory variable corresponding to the parent page in the second object in response to determining that the second object exists in the target file by traversing the target file.

15. The page display apparatus according to claim 14, wherein the processor is further configured to:

send a second request to the server to obtain the target parameter string from the server, in response to determining that a value of the second parameter memory variable is a target value by using a parameter parsing function;

obtain the first parameter string by decrypting the target parameter string;

obtain the initial parameter string by decoding the first parameter string, and converting the initial parameter string to the page jump parameter of the parent page;

jump back to the parent page from the child page according to the page jump parameter.

16. The page display apparatus according to claim 15, wherein the processor is further configured to:

assign a current value of the page jump parameter to an option variable, wherein the option variable is configured to save a default value of the page jump parameter; jump back to the parent page from the child page according to the assigned option variable.

17. A non-transitory computer-readable storage medium, having computer programs stored thereon, wherein the computer programs implement following steps when executed by a processor:

sending, by a terminal device, a first request to a server, and jumping from displaying, on a display screen of the terminal device, the parent page to displaying, on the display screen of the terminal device, a child page corresponding to target data, in response to determining that the terminal device receives, from a user, a query operation for the target data in the parent page displayed on the display screen of the terminal device, wherein the first request carries a page jump parameter of the parent page and is configured to request the server to store the page jump parameter of a parent page in a database of the server; and sending, by the terminal device, a second request to the server to obtain the page jump parameter of the parent page stored in the database of the server, receiving the page jump parameter of the parent page from the server, and jumping from displaying, on the display screen of the terminal device, the child page back to displaying, on the display screen of the terminal device, the parent page according to the page jump parameter.

\*   \*   \*   \*   \*